Sept. 26, 1967 A. POLLAK 3,344,232

KEYED AUTOMATIC GAIN CONTROL CIRCUIT IN A TELEVISION RECEIVER

Filed March 23, 1964 3 Sheets-Sheet 1

INVENTOR
Alfred Pollak
BY Spencer & Kaye
ATTORNEYS

Sept. 26, 1967 A. POLLAK 3,344,232

KEYED AUTOMATIC GAIN CONTROL CIRCUIT IN A TELEVISION RECEIVER

Filed March 23, 1964 3 Sheets-Sheet 2

INVENTOR
Alfred Pollak

BY Spencer & Kaye

ATTORNEYS

Sept. 26, 1967 A. POLLAK 3,344,232

KEYED AUTOMATIC GAIN CONTROL CIRCUIT IN A TELEVISION RECEIVER

Filed March 23, 1964 3 Sheets-Sheet 3

INVENTOR
Alfred Pollak

BY Spencer & Kaye
ATTORNEYS

United States Patent Office 3,344,232
Patented Sept. 26, 1967

3,344,232
KEYED AUTOMATIC GAIN CONTROL CIRCUIT IN A TELEVISION RECEIVER

Alfred Pollak, Hannover, Germany, assignor to Telefunken Patentverwertungsgesellschaft m.b.H., Ulm (Danube), Germany Filed Mar. 23, 1964, Ser. No. 353,936
Claims priority, application Germany, Mar. 22, 1963, T 23,679
10 Claims. (Cl. 178—7.3)

ABSTRACT OF THE DISCLOSURE

A keyed automatic gain control circuit for eliminating the undesirable effects which would otherwise result in a television set from the failure of synchronization between the synchroninzing pulses of the video signal and the locally generated keying pulses, by applying to the keying control circuit a bias voltage which approximates the black-level of the video signals for those intervals when the sychronizing pulses and the locally produced pulses are not in synchronism.

The present invention relates generally to a keyed automatic gain control circuit for television receivers, and, more particularly, to a circuit which uses locally produced pulses for gauging a periodically recurring reference level of the received mixed signal.

In circuits for obtaining a control voltage by keying a periodically repeating reference level of the received mixed signal, an undesirable disadvantage which often occurs is that the keying pulses are not in phase with the synchronizing pulses in the video signal. If synchronization fails, the automatic gain control (AGC) voltage is produced in the receiver which depends upon the brightness of the video signal which at that time is in phase with the keying pulse.

Particularly in the case of large high frequency (HF) input voltages and a steep control slope of the AGC circuit, the amplifier and mostly the video amplifier is overloaded. If this proceeds so far as to completely cut off the synchronizing pulses in the lower bend of the characteristic of the video amplifier tube, no synchronizing pulses are passed through the cut off stage. In this case, the cut off stage separates the blanking pulses and the picture content. With this mixture, the line synchronizing circuit can not operate properly any longer so that synchronization can no longer be obtained. Because of this, the keyed control is also disturbed and the synchronization is arrested in this out-of-phase state. The overload of the video amplifier is larger when more white portions are provided in the picture.

An entirely white picture would have the advantage that no picture content can be separated therefrom so that the synchronizing circuit can still operate relatively safely with the blanking pulses. Most dangerous is a white picture with few vertical black stripes. In this case the entire overload of the video amplifier is retained and the cut off stage cuts off the picture content. The stripes have the effect of synchronizing signals with an entirely wrong phase position and disturb the synchronization. Such disturbances extensively limit the reliability of operation of an automatic line synchronization. Also, the interference gating of such a device may become a synchronizing pulse gating if at high video voltages the cut off of the picture content is no longer sufficient.

With these problems of the prior art in mind, it is a main object of the present invention to provide an arrangement which diminishes such disturbances or eliminates them entirely.

Another object is to accomplish the above in a relatively simple and inexpensive manner. The invention provides a keyed AGC circuit for television receivers in which a rectifier with a load resistor connected in the control circuit of the keying or gating device and containing two resistors is connected to the signal path. A capacitor is connected in parallel to a portion of the load resistance. This capacitor is charged by diode current to a potential which approximately corresponds to the black level of the signals in such a manner that if the keying pulses and the synchronizing pulses appearing at the load resistance are not synchronized, a control voltage is produced which depends upon the capacitor voltage. If there is synchronism, a control voltage is produced which depends upon the synchronizing pulse amplitude or on the black shoulder of the signal at the load resistance.

An AGC circuit is known, for example, as disclosed in German Patent No. 1,038,598 in which the cathode of the keying tube is connected to the cathode of the video output tube. The same signal is fed to the control grid of the keying tube and the level of the synchronizing pulse peaks is determined by a peak rectifier. If in this known circuit synchronization fails, the influence of the picture content on the control voltage disappears. Besides the fact that this circuit can not be used in grid-controlled triode keying circuits, there is the disadvantage in this circuit that the peak rectifier responds to all interferences and disturbances exceeding the synchronizing pulse level and thus destroys the advantages of the keying control.

Additional objects and advantages of the present invention will become apparent upon consideration of the following description when taken in conjunction with the accompanying drawings in which.

Figure 1:
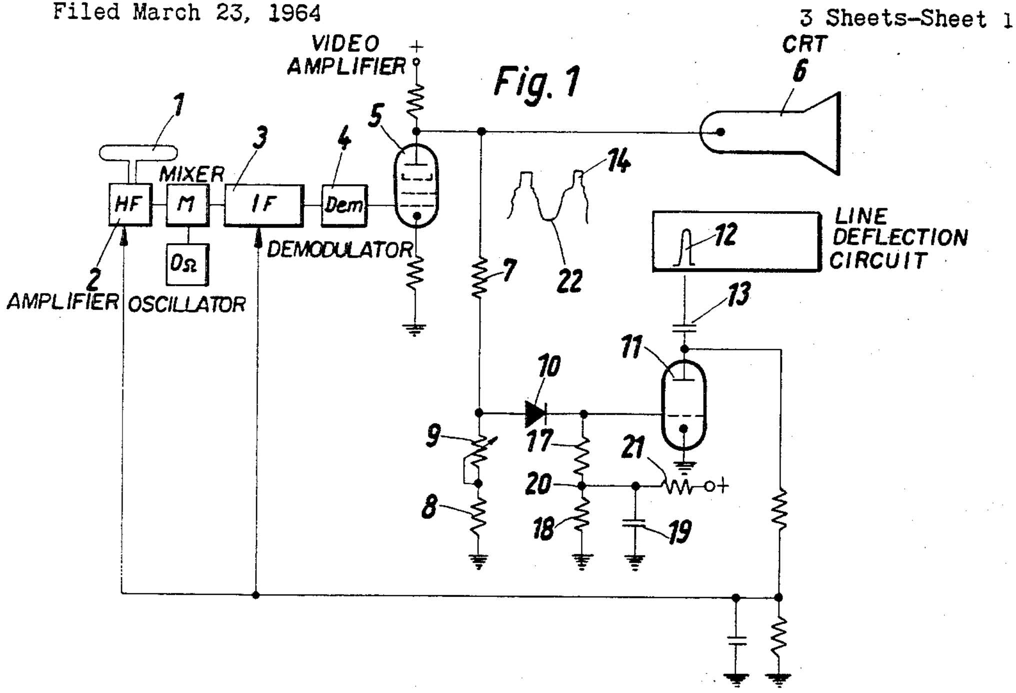
FIGURE 1 is a circuit diagram illustrating the present invention.

With more particular reference to the drawings, FIGURE 1 illustrates a portion of a television receiver in which signals are received at an antenna 1 and are fed to a high frequency amplifier 2. After amplification and mixing the intermediate frequency (IF) signals are fed to a demodulator 4 by means of an IF amplifier 3. From the demodulator 4, the mixture of video frequencies which includes the D.C. component, is fed to a video amplifier 5. The output voltage of video amplifier 5 is on the one hand fed to the picture tube 6 and on the other hand fed to the anode of a rectifier 10 via a voltage divider including the resistors 7, 8, and 9.

The cathode of the rectifier 10 is connected to the control grid of the tube 11. This tube 11 is fed with positive and locally produced pulses by means of its anode. These pulses are particularly the fly-back pulses 12 which may be obtained from the line deflection circuit and they are fed via a condenser 13. By comparison of the amplitude of the constant fly-back pulses 12 and the synchronizing pulses 14 at the control grid of tube 11, a D.C. voltage is produced which is fed to the high and/or intermediate frequency amplifiers 2 and 3, respectively.

The circuit which has been thus far described still suffers from the disadvantages mentioned above if the synchronization of the device and thus the phase relationship between pulses 14 and 12 disappears. These disadvantages are avoided by connecting the cathode of diode 10 to ground by means of a voltage divider including resistors 17 and 18, and by connecting a tap of the voltage divider with ground via a capacitor 19 so that it is in parallel with resistor 18. The tap 20 of the voltage divider is suitably connected with the positive operating voltage by means of a resistor 21 in order to produce a threshold value for diode 10. The voltage at divider 17, 18 approximately corresponds to the grey level value of the video signal. Therefore, the diode is conductive for all signal portions of the video signal 22 which are darker than grey.

In this manner the capacitor 19 is charged to a positive potential which corresponds approximately to the black level value of the video signal because of the tap. The time constant of the RC member 18, 19 is provided with suitable values so that the fifty or sixty cycle pulse does not cause significant change in the charge.

During operation, the diode 10 is practically blocked for all signal amplitudes which are below the charge of the capacitor 19. The voltage at capacitor 19 always appears at the control electrode of the keying or gating tube 11. However, it does not provide any effect here at the grid if synchronizing pulses 14 and fly-back pulses 12 are in phase. If the keying pulses are not in synchronism with the synchronizing pulses, then keying takes place in the pulse gaps to the potential of the capacitor 19 which corresponds approximately to the black level value.

In this case the generation of the control voltage becomes almost independent of the synchronization of the keying pulses. In order to carry out the invention it is advantageous to provide a diode with a high blocking resistance and small capacitance controlled by a low-ohmic voltage divider 7, 8, 9. In this case the diode could be operated without threshold value. In this event there is hardly any dependence of the voltage at the capacitor 19 upon the picture content. However, such a low-ohmic resistance cannot always be used because of the load upon the video amplifier which would become too large. Since the video voltage divider 7, 8, 9 cannot be provided as low-ohmic as desired and since the operating or load resistance 17, 18 of diode 10 cannot be made as high-ohmic as desirable, the synchronizing level is somewhat dependent upon the fluctuation of the picture content.

For this reason a positive operating voltage is applied to the load circuit 17, 18 of diode 10 by means of a resistor 21 in order to obtain a threshold value. The resistors 21, 18 are provided with values such that a voltage is present at their connection point, and this voltage corresponds to the grey level of the signals, the diode being blocked or in a non-conductive condition.

For signals which are darker than this grey level value the diode current then supplements the charge upon the capacitor up to the black level. In order to compensate for an error in synchronization level caused by the picture content, and which error had not been compensated for as yet at medium and maximum contrast, a voltage which is dependent upon the picture content is fed to the keying tube 11 through its cathode. Such a voltage is derived, for example, from the cathode of the picture tube. Correspondingly a resistor is also connected in the cathode circuit. For eliminating this error the resistor 7 can likewise or additionally be completely or partly bridged by a capacitor. At low contrast a minor negative black level might still remain, but it will not show in the picture because the errors caused by the fluctuating voltage in the network elements are substantially larger. No errors result from interferences in the received signal since the charge at capacitor 19 would have to become larger than the synchronization level because of the interferences in order to effect a change of the control voltage through interferences. In this circuit it is not necessary to increase the control time constant. The surging amplitude is small. Neutralizing of the keying tube could, for example, be carried out at the grid of tube 11 by feeding fly-back pulses, which are more negative to this grid by means of a capacitor. However, it is also possible to connect a positive fly-back pulse into the cathode circuit. In this event, however, the anode and grid of tube 11 would have to be well decoupled.

Figure 2:
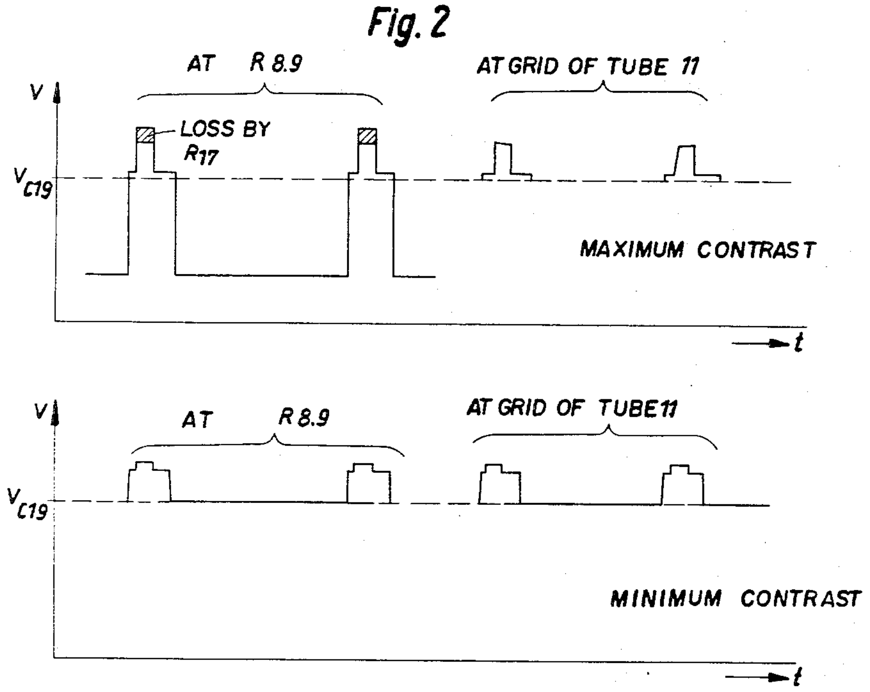
FIGURE 2 is a view illustrating some of the voltage curves which appear at various points in the circuit.

FIGURE 2 indicates the voltages at voltage divider 7, 8, 9, and at voltage divider 17, 18, for maximum and minimum contrast.

Figure 3:
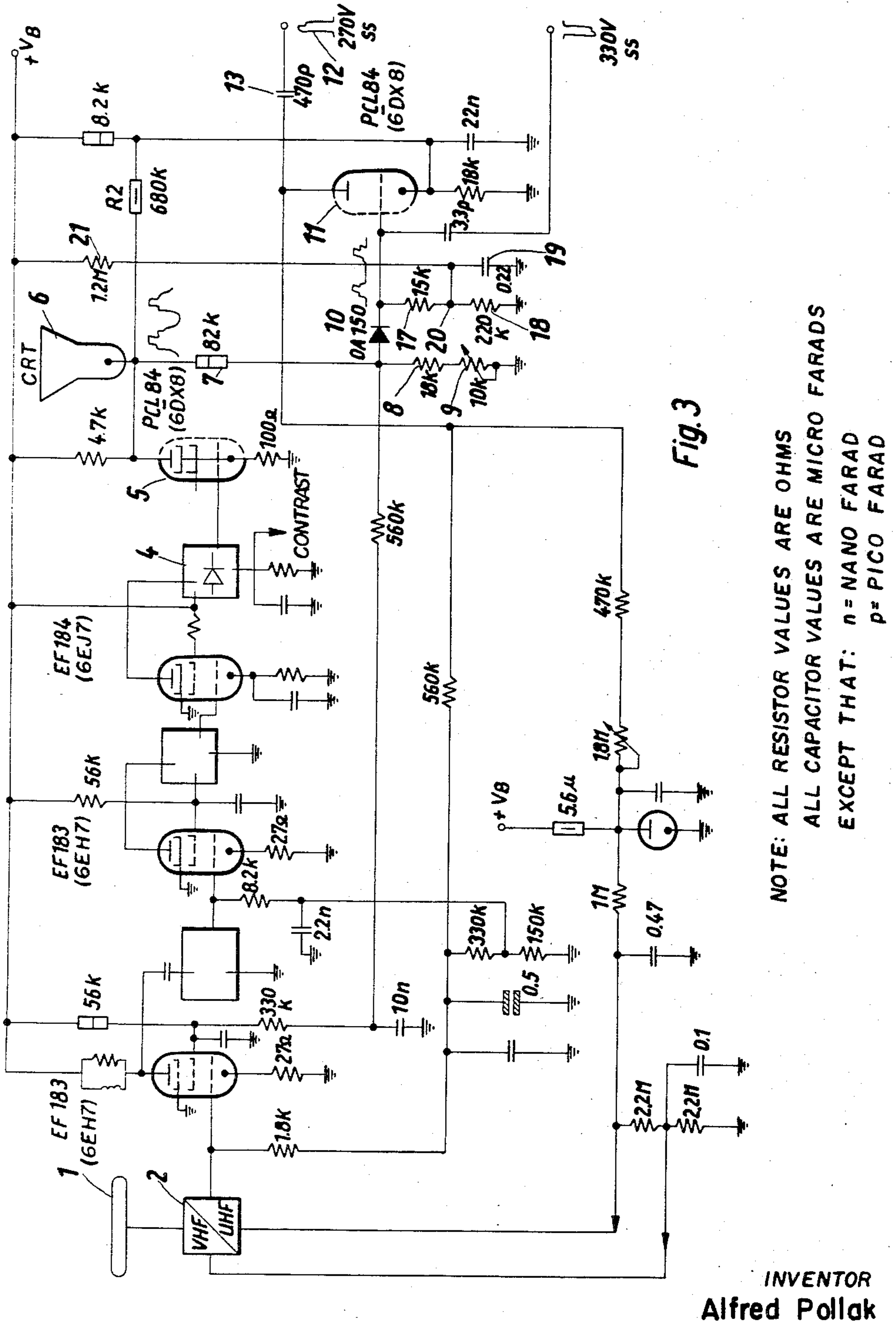
FIGURE 3 is a schematic circuit diagram of a practical embodiment of the invention shown in FIGURE 1.

FIGURE 3 is a detailed practical embodiment incorporating the circuit of FIGURE 1 and wherein values of components are shown and tube types indicated (American equivalent types are shown in brackets).

Figure 4:
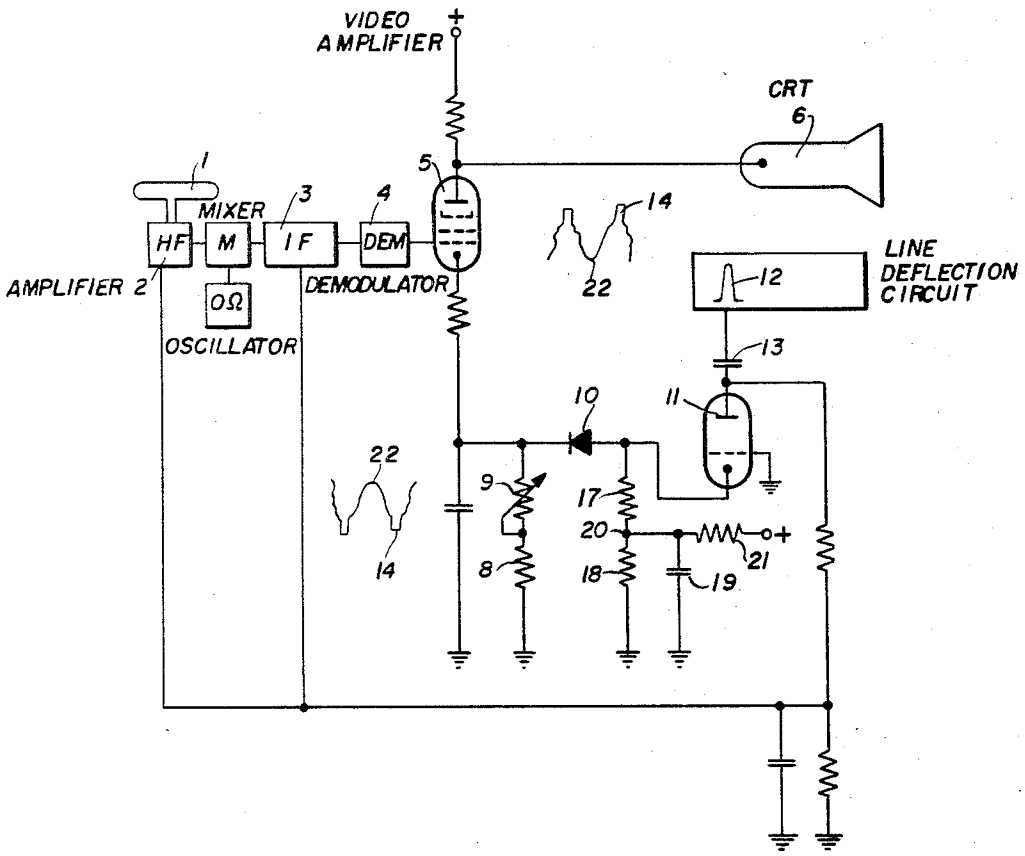
FIGURE 4 is a circuit diagram illustrating one embodiment of the invention.

The invention is not limited to control of the keying tube 11 at the control grid. The control of the keying tube 11 can also take place at the cathode when, for example, taking the video signal from the cathode of the video amplifier tube via a diode 10 of the opposite polarity, as shown in FIGURE 4.

It will be understood that the above description of the present invention is susceptible to various modifications, changes, and adaptations, and the same are intended to be comprehended within the meaning and range of equivalents of the appended claims.

What is claimed is:

1. A keyed automatic gain control circuit for television receivers in which periodically recurring reference level pulses forming a part of the received video signal are gated by locally produced pulses, comprising, in combination:
- a keying device having a control circuit;
- a rectifier load resistance including two resistors;
- a rectifier connected to said load resistance and connected in the control circuit of the keying device and in the signal path; and
- capacitor means connected in parallel with a part of the load resistance to be charged by rectifier current to a voltage approximately corresponding to the black-level of the signals so that when the locally produced pulses and the periodically recurring pulses at the load resistance are not in synchronism a control voltage is produced dependent upon the capacitor voltage and when they are in synchronism a control voltage is produced which is dependent upon the amplitude of the periodically recurring pulses.

2. A circuit as defined in claim 1 wherein said rectifier is arranged to be biassed so that it becomes conductive only at signal amplitudes which exceed a predetermined grey-level in the direction toward the pulse peak.

3. A circuit as defined in claim 2 further comprising an operating voltage resistor connected to one of said resistors of said load resistance, said operating voltage resistor and said one of said resistors defining a voltage divider and the voltage at their connection point providing the bias for said rectifier.

4. A circuit as defined in claim 1 wherein said keying device is a keying tube and the load resistance is connected to the control grid of the tube.

5. A circuit as defined in claim 1 wherein said keying device is a keying tube and the load resistance is connected to the cathode circuit of said tube.

6. A keyed automatic gain control circuit for television receivers including a video amplifier and a line deflection circuit, comprising, in combination:
- first voltage divider means connectible to the output of a video amplifier;
- rectifier means having an anode and a cathode, said anode being connected to said first voltage divider means;
- keying means having an anode, a cathode, and a control electrode, said control electrode being connected to the cathode of said rectifier means, an automatic gain control line connected to the anode of said keying means for feeding a control signal to prior receiver stages, said anode being connectible to a line deflection circuit to feed fly-back pulses to the anode of said keying means via a capacitor;
- second voltage divider means connected to the cathode of said rectifier means; and capacitor means connected to said second voltage divider means.

7. A keyed automatic gain control circuit for television receivers, comprising, in combination:

video amplifier means;

first voltage divider means connected to the output of said video amplifier means and including first, second and third resistors, the free end of said third resistor being connected to ground;

rectifier means having an anode and a cathode, said anode being connected to a first tap between said first and second resistors;

keying means having an anode, a cathode, and a control electrode, said control electrode being connected to the cathode of said rectifier means, said keying means cathode being connected to ground, an automatic gain control line connected to the anode of said keying means for feeding a control signal to prior receiver stages;

line deflection circuit means connected to feed fly-back pulses to the anode of said keying means via a capacitor;

second voltage divider means connected to the cathode of said rectifier means and including fourth and fifth resistors, the free end of said fifth resistor being connected to ground;

capacitor means connected between a second tap between said fourth and fifth resistors and ground; and a sixth resistor connected to said second tap and for connection with operating voltage.

8. A keyed automatic gain control circuit for television receivers in which the mixed video signal including the synchronizing pulses is keyed by pulses produced locally in the receiver, said circuit comprising, in combination:

keying means having a control circuit;

a load resistance including two resistors;

a diode connected to said load resistance and connected in the control circuit of the keying means and in the signal path; and capacitor means connected in parallel with a part of the load resistance to be charged by diode current to a voltage approximately corresponding to the black-level of the signals so that when the locally produced pulses and the synchronizing pulses at the load resistance are out of synchronism a control voltage is produced which is dependent upon the capacitor voltage, and when the pulses are in synchronism a control voltage is produced which is dependent upon the black-level of the signal at the load resistance.

9. A circuit as defined in claim 8 wherein said load resistance includes a plurality of resistors, one of said resistors being connected to operating voltage to provide bias for said diode.

10. A circuit as defined in claim 8, comprising second voltage divider means connectible to the output of a video amplifier and including first, second and third resistors, the free end of said third resistor being connected to ground, said diode having an anode and a cathode, said anode being connected to a first tap between said first and second resistors; said keying means having an anode, a cathode and a control electrode, said control electrode being connected to the cathode of said diode, said keying means cathode being connected to ground, an automatic gain control line connected to the anode of said keying means for feeding a control signal to prior receiver stages, said anode being connectible to a line deflection circuit to feed fly-back pulses to the anode of said keying means; said first recited voltage divider means being connected to the cathode of said diode and including fourth and fifth resistors, the free end of said fifth resistor being connected to ground; said capacitor means being connected between a second tap between said fourth and fifth resistors and ground; and a sixth resistor connected to said second tap and for connection with operating voltage.

References Cited

UNITED STATES PATENTS 2,875,277 2/1959 Cope et al. ---------- 178—7.3

JOHN W. CALDWELL, *Acting Primary Examiner.*

R. L. RICHARDSON, *Assistant Examiner.*